(12) United States Patent
Huh et al.

(10) Patent No.: US 11,796,764 B2
(45) Date of Patent: Oct. 24, 2023

(54) CAMERA MODULE WITH TELEPHOTO IMAGING INCLUDING THREE LENSES OF +-+, FOUR LENSES OF +---+, OR FIVE LENSES OF +-+-+ OR +---+- REFRACTIVE POWERS

(71) Applicant: Samsung Electro-Mechanics Co., Ltd., Suwon-si (KR)

(72) Inventors: Jae Hyuk Huh, Suwon-si (KR); Jin Se Kim, Suwon-si (KR); Yong Joo Jo, Suwon-si (KR); So Mi Yang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 343 days.

(21) Appl. No.: 17/024,829

(22) Filed: Sep. 18, 2020

(65) Prior Publication Data

US 2021/0364751 A1 Nov. 25, 2021

(30) Foreign Application Priority Data

May 19, 2020 (KR) .......................... 10-2020-0059949

(51) Int. Cl.
*G02B 13/00* (2006.01)
*G02B 13/02* (2006.01)
*G02B 9/60* (2006.01)

(52) U.S. Cl.
CPC .......... *G02B 13/0045* (2013.01); *G02B 9/60* (2013.01); *G02B 13/0065* (2013.01); *G02B 13/02* (2013.01)

(58) Field of Classification Search
CPC .. G02B 13/0045; G02B 9/60; G02B 13/0065; G02B 13/02
See application file for complete search history.

(56) References Cited

U.S. PATENT DOCUMENTS

| 10,877,245 B2 | 12/2020 | Yoo et al. |
| 2003/0156834 A1 | 8/2003 | Ogata |
| 2004/0090683 A1 | 5/2004 | Nagata |

(Continued)

FOREIGN PATENT DOCUMENTS

| CN | 109425967 A | 3/2019 |
| CN | 209327664 U | 8/2019 |

(Continued)

OTHER PUBLICATIONS

Korean Office Action dated Jul. 7, 2021 in counterpart Korean Patent Application No. 10-2020-0059949 (9 pages in English and 6 pages in Korean).

(Continued)

*Primary Examiner* — Wen Huang
(74) *Attorney, Agent, or Firm* — NSIP Law

(57) ABSTRACT

A camera module includes a first optical path conversion unit configured to reflect or refract light incident along a first optical axis in a direction of a second optical axis that intersects the first optical axis, a second optical path conversion unit configured to reflect or refract light incident on the second optical axis in a direction of a third optical axis that respectively intersects the first optical axis and the second optical axis, and an optical imaging system disposed between the first optical path conversion unit and the second optical path conversion unit.

17 Claims, 9 Drawing Sheets

(56) References Cited

U.S. PATENT DOCUMENTS

| | | | |
|---|---|---|---|
| 2007/0126911 | A1 | 6/2007 | Nanjo |
| 2009/0153726 | A1 | 6/2009 | Lim |
| 2010/0231781 | A1 | 9/2010 | Lee |
| 2012/0224270 | A1 | 9/2012 | Sakamoto |
| 2017/0108669 | A1 | 4/2017 | Kim |
| 2018/0017767 | A1* | 1/2018 | Chen .............. G02B 27/646 |
| 2018/0067335 | A1 | 3/2018 | Chen et al. |
| 2018/0364455 | A1 | 12/2018 | Chen et al. |
| 2019/0025558 | A1* | 1/2019 | Chen .............. G02B 13/0045 |
| 2019/0056566 | A1 | 2/2019 | Yoo et al. |
| 2019/0243112 | A1 | 8/2019 | Yao et al. |
| 2019/0273848 | A1* | 9/2019 | Satoh .............. G03B 17/17 |
| 2020/0088972 | A1 | 3/2020 | Yoo et al. |
| 2020/0096745 | A1 | 3/2020 | Chang et al. |
| 2021/0318522 | A1* | 10/2021 | Zhang .............. G02B 13/0065 |
| 2022/0214527 | A1* | 7/2022 | Hua .............. G02B 13/0035 |

FOREIGN PATENT DOCUMENTS

| | | |
|---|---|---|
| CN | 209525527 U | 10/2019 |
| CN | 110554479 A | 12/2019 |
| CN | 110764232 A | 2/2020 |
| CN | 210093323 U | 2/2020 |
| CN | 110908071 A | 3/2020 |
| CN | 210323553 U | 4/2020 |
| CN | 210514766 U | 5/2020 |
| JP | 2003-149563 A | 5/2003 |
| JP | 2012-194549 A | 10/2012 |
| KR | 10-2009-0062472 A | 6/2009 |
| KR | 10-2010-0070050 A | 6/2010 |
| KR | 10-2010-0103292 A | 9/2010 |
| KR | 10-2017-0043943 A | 4/2017 |
| KR | 10-2019-0020421 A | 3/2019 |
| KR | 10-2019-0071569 A | 6/2019 |
| KR | 10-2019-0088715 A | 7/2019 |
| TW | 200736657 A | 10/2007 |
| TW | 201905531 A | 2/2019 |
| WO | WO 2019/117652 A1 | 6/2019 |

OTHER PUBLICATIONS

Korean Office Action dated Jan. 25, 2022, in the corresponding Korean Patent Application No. 10-2020-0059949. (10 pages in English and 7 pages in Korean).

Taiwanese Office Action dated Jan. 15, 2021 in counterpart Taiwanese Patent Application No. 109133188 (19 pages in English, 15 pages in Chinese).

Indian First Examination Report dated Dec. 6, 2021 in corresponding Indian Patent Application No. 202014042461. (6 pages in English and Indian).

Chinese Office Action dated May 7, 2021 in counterpart Chinese Patent Application No. 202022716267.4 (2 pages in English, 2 pages in Chinese).

Chinese Office Action dated May 18, 2022, in the counterpart Chinese Patent Application No. 202011313649.0. (9 pages in English and 12 pages in Chinese).

\* cited by examiner

CAMERA MODULE WITH TELEPHOTO IMAGING INCLUDING THREE LENSES OF +−+, FOUR LENSES OF +−−+, OR FIVE LENSES OF +−+−+ OR +−−+− REFRACTIVE POWERS

CROSS-REFERENCE TO RELATED APPLICATION(S)

This application claims the benefit under 35 USC § 119(a) of Korean Patent Application No. 10-2020-0059949, filed on May 19, 2020, in the Korean Intellectual Property Office, the entire disclosure of which is incorporated herein by reference for all purposes.

BACKGROUND

1. Field

The following description relates to a telephoto imaging camera module.

2. Description of Related Art

A camera module may be mounted on a portable terminal. In an example, camera modules may be mounted on respective front and rear surfaces of wireless communications terminals. Since the camera module of the portable terminal may be easy to use and carry, the camera module may be used to image not only short-range objects, but also remote or distant objects. Therefore, it may be beneficial that the camera module of the portable terminal have telephoto capabilities, comparable to that of a general camera. However, since the space to mount a camera module may be limited based on the size of the wireless terminal, it may be difficult to implement or perform telephoto capabilities. Accordingly, it may be beneficial to develop an optical imaging system and a camera module that realizes telephoto performance without increasing the size of the wireless terminal.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In a general aspect, a camera module includes a first optical path conversion unit, configured to reflect or refract light incident along a first optical axis in a direction of a second optical axis that intersects the first optical axis; a second optical path conversion unit, configured to reflect or refract light incident along the second optical axis in a direction of a third optical axis that respectively intersects the first optical axis and the second optical axis; and an optical imaging system disposed between the first optical path conversion unit and the second optical path conversion unit.

The optical imaging system may satisfy a conditional expression, 0.5<BFL/f, where BFL is a distance from an image-side surface of a lens closest to an imaging plane in the optical imaging system to the imaging plane, and f is a focal length of the optical imaging system.

The optical imaging system may include a first lens, a second lens, and a third lens sequentially disposed from an object side to an imaging side.

The first lens may have positive refractive power, the second lens has negative refractive power, and the third lens has positive refractive power.

The optical imaging system may include a fourth lens and a fifth lens having refractive power.

The optical imaging system comprises a first lens, a second lens, a third lens, and a fourth lens sequentially disposed from an object side to an imaging side.

The first lens may have positive refractive power, the second lens may have negative refractive power, the third lens may have negative refractive power, and the fourth lens has positive refractive power.

A focal length (f) of the optical imaging system may be equal to or greater than 19 mm.

A distance from a first intersection point of the first optical axis and the second optical axis to a second intersection point of the second optical axis and the third optical axis may be greater than a focal length (f) of the optical imaging system.

In a general aspect, a camera module includes a first optical path conversion unit and a second optical path conversion unit, each configured to change an optical path; and an optical imaging system disposed between the first optical path conversion unit and the second optical path conversion unit, the optical imaging system including one or more lens groups, wherein the optical imaging system satisfies a conditional expression, 4.0<BFL/ImgHT, where BFL is a distance from an image-side surface of a lens disposed closest to an imaging plane to the imaging plane, and ImgHT is a height of the imaging plane.

The one or more lens groups may include a first lens, a second lens, and a third lens sequentially disposed from an object side to an imaging side.

The first lens may have positive refractive power.

The third lens may have a shape of which an object-side surface is convex and of which an image-side surface is concave.

The one or more lens groups may include a fourth lens having refractive power.

The one or more lens groups may include a fifth lens having refractive power.

The BFL may be equal to or greater than 15 mm.

In a general aspect, a terminal device includes a camera module including a first reflective member, and a second reflective member, each respectively configured to change an optical path; and an optical imaging system comprising: a first lens comprising a positive refractive power; a second lens comprising a negative refractive power; and a third lens comprising a convex object-side surface and a concave image-side surface; wherein a focal length of the optical imaging system is equal to or greater than 19 mm.

A back focal length (BFL) of the optical imaging system may be equal to or greater than 15 mm.

A focal length of the first lens may be in a range of 8.0 mm to 25.0 mm.

The first lens, the second lens, and the third lens may be disposed between the first reflective member and the second reflective member.

In a general aspect, a camera module includes a first lens comprising a positive refractive power; a second lens comprising a negative refractive power; a third lens comprising refractive power; a fourth lens; a fifth lens; a first reflective member disposed on an object side of the first lens, and configured to change a first optical path; a second reflective member disposed on an image side of the fifth lens, and configured to change a second optical path, and a third reflective member disposed adjacent to the second reflective member, and configured to change a third optical path, wherein the first to fifth lenses are sequentially disposed from an object side toward an image side.

The second lens may have a focal length in a range of −50.0 mm to −6.0 mm.

A refractive index of the third lens may be equal to or greater than 1.65.

The first lens may have a convex object-side surface.

Other features and aspects will be apparent from the following detailed description, the drawings, and the claims.

Figure 1:
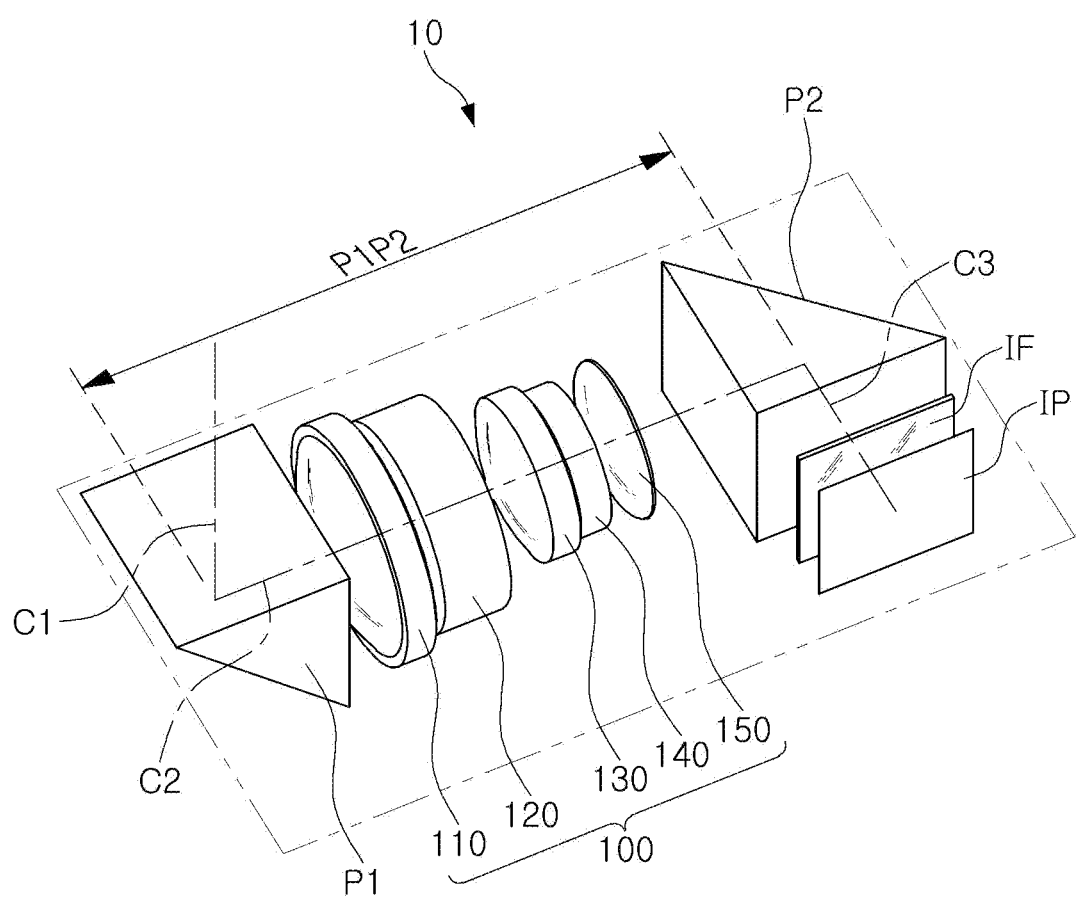
FIG. 1 illustrates an example camera module, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

Additionally, in the examples herein, the first lens indicates the lens closest to the object (or a subject), and the fifth lens indicates the lens closest to the image plane (or an image sensor). In the examples herein, the radius of curvature of the lens, thickness, TTL, ImgHT (a height of the imaging plane: ½ of the diagonal length of the imaging plane), and focal length are all in mm. Additionally, the thickness of the lens, the distance between the lenses, TTL, BFL, distance, etc. are numerical values calculated based on the optical axis of the optical imaging system. Additionally, in the description of the shape of the lens, the recitation that one surface has a convex shape indicates that the optical axis portion of the surface is convex, and the recitation that one surface has a concave shape indicates that the optical axis portion of the surface is concave. Therefore, even when it is described that one surface of the lens is convex, the edge portion of the lens may be concave. Similarly, even when it is described that one surface of the lens is concave, the edge portion of the lens may be convex.

The camera module according to an example is configured to be mounted on a thin portable terminal, or a portable device that has a slim form factor. In an example, the height of one side of the camera module may be less than the thickness of the portable terminal. The camera module is configured to have a considerable focal length. For example, the distance from a frontmost lens of the camera module to the imaging plane of the image sensor may be greater than the thickness of the portable terminal.

The camera module is configured to have a refracted optical path. Specifically, the camera module may be configured such that three non-parallel optical paths are formed. For example, a first optical path, a second optical path, and a third optical path may be formed inside the camera module. The first optical path may indicate a path of light incident on the camera module along a first optical axis. For example, the first optical path may be a path of light along which the light reflected from an imaging object moves to the camera module. The second optical path may indicate a path of light moving on a second optical axis. For example, the second optical path may be a path of light moving along the optical axis of the optical imaging system provided inside the camera module. The third optical path may indicate a path of light moving on a third optical axis. For example, the third optical path may be a path along which light emitted from the optical imaging system moves to the imaging plane. The optical paths or optical axis of the camera module may be configured to intersect. For example, the first optical path (the first optical axis) may be configured to intersect the second optical path (the second optical axis), and the second optical path (the second optical axis) may be configured to intersect the third optical path (the third optical axis). Additionally, the first optical path (the first optical axis) may be configured to intersect the third optical path (the third optical axis). Accordingly, the camera module according to an example may include, as non-limiting examples, three optical paths or optical axes that are not parallel to each other. The intersection of the optical paths or the optical axes may have a predetermined relationship with the focal length of the optical imaging system. For example, a distance, from a first intersection point at which the first optical path (the first optical axis) and the second optical path (the second optical axis) intersect, to a second intersection point at which the second optical path (the second optical axis) and the third optical path (the third optical axis) intersect, may be greater than the focal length of the optical imaging system.

The camera module may include a plurality of optical path conversion units or reflective members. For example, the camera module may include a first optical path conversion unit and a second optical path conversion unit. However, the number of optical path conversion units constituting the camera module is not limited to two thereof. For example, the camera module may include three optical path conversion units. The first optical path conversion unit and the second optical path conversion unit may be disposed in front and rear locations of the camera module, respectively. For example, the first optical path conversion unit may be disposed closest to the object side, and the second optical path conversion unit may be disposed closest to the imaging plane of the image sensor. The first optical path conversion unit and the second optical path conversion unit are configured to change the path of light incident to the camera module. For example, the first optical path conversion unit is configured to reflect or refract light incident on or along the first optical axis in the direction of the second optical axis intersecting the first optical axis, and the first optical path conversion unit is configured to reflect or refract light incident along the second optical axis in the direction of the third optical axis intersecting the first optical axis and the second optical axis. The optical path conversion unit may be one of members that reflect or refract the optical path. For example, the optical path conversion unit may be formed in the form of a prism, a reflector, or the like. The optical path conversion unit may be disposed at the intersection of the optical paths (the optical axes). For example, the first optical path conversion unit may be disposed at the intersection of the first optical path and the second optical path, and the second optical path conversion unit may be disposed at the intersection of the second optical path and the third optical path.

The camera module includes an optical imaging system. The optical imaging system may be disposed between the first optical path conversion unit and the second optical path conversion unit. The optical imaging system may include one or more lens groups. The lens group may include a plurality of lenses. As an example, the lens group may include a first lens, a second lens, and a third lens that are sequentially disposed from the object side. However, the number of lenses constituting the lens group is not limited to three. In an example, the lens group may include a first lens, a second lens, a third lens, and a fourth lens that are sequentially disposed from the object side. As another example, the lens group may include a first lens, a second lens, a third lens, a fourth lens, and a fifth lens that are sequentially disposed from the object side.

The camera module may include a driving unit that drives the optical imaging system. The driving unit may include a driving magnet and a driving coil. The driving magnet may be disposed in an optical imaging system or a lens barrel accommodating the optical imaging system. The driving coil may be disposed in a body of the camera module or in a housing that accommodates the lens barrel. The driving unit may move the optical imaging system on the second optical axis. For example, the driving unit may move the optical imaging system to the object side or the imaging plane side, such that the focal length of the camera module may be adjusted.

Next, the optical imaging system constituting the camera module will be described in detail.

The optical imaging system according to an example includes an optical system comprised of a plurality of lenses. In an example, the optical system of the optical imaging system may be comprised of a plurality of lenses having refractive power. However, the optical imaging system is not necessarily comprised of only lenses having refractive power. For example, the optical imaging system may include a prism for refracting incident light, and a stop for adjusting the amount of light. Additionally, the optical imaging system may include an infrared cut filter for blocking infrared light. Further, the optical imaging system may further include an image sensor converting an image of a subject incident through the optical system into an electrical signal. Additionally, the optical imaging system may further include a gap maintaining member adjusting the distance between the lens and the lens.

A plurality of lenses may be formed of a material having a refractive index different from a refractive index of air. In an example, the plurality of lenses may be formed of plastic or glass. At least one of the plurality of lenses has an aspherical shape. The aspherical surface of the lens is represented by Equation 1 below.

$$z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}$$

Equation 1

In Equation 1, c is the reciprocal of the radius of curvature of the lens, K is a conic constant, r is the distance from any point on the aspherical surface to the optical axis, A to J are aspherical constants, and Z (or SAG) is the height in the optical axis direction, from any point on the aspherical surface to the apex of the aspherical surface.

The optical imaging system may include three or more lenses. In an example, the optical imaging system may include a first lens, a second lens, and a third lens that are sequentially disposed from the object side. However, the number of lenses constituting the optical imaging system is not limited to three thereof. For example, the optical imaging system may be comprised of, as non-limiting examples, four lenses or five lenses as described above.

The first to third lenses, the first to fourth lenses, and the first to fifth lenses may be arranged at intervals from neighboring lenses. For example, a predetermined gap may be formed between an image-side surface of a lens and an object side of a lens adjacent thereto.

The first lens may have a predetermined degree of refractive power. For example, the first lens may have positive refractive power. The first lens may have a shape of which one surface is convex. In an example, the first lens may have a convex object-side surface. The first lens may have a predetermined refractive index. For example, the first lens may have a refractive index of less than 1.6. The first lens may have a predetermined focal length. In an example, the focal length of the first lens may be determined in the range of 8.0 to 25.0 mm.

The second lens may have a predetermined degree of refractive power. For example, the second lens may have negative refractive power. The second lens may have a shape of which one surface is concave. For example, the second lens may have a concave image-side surface. The second lens may have a predetermined refractive index. For example, the refractive index of the second lens may be greater than or equal to 1.6. The second lens has a predetermined focal length. For example, the focal length of the second lens may be determined in a range of −50.0 to −6.0 mm.

The third lens may have a predetermined degree of refractive power. For example, the third lens may have positive or negative refractive power. The third lens may have a shape of which one surface is convex. For example, the third lens may have a convex object-side surface. The third lens may have a predetermined refractive index. For example, the refractive index of the third lens may be 1.65 or more. Additionally, the refractive index of the third lens may be greater than the refractive index of other lenses constituting the optical imaging system. The third lens may have a predetermined focal length. In an example, the focal length of the third lens may be selected to be less than −100 mm, or to be 16 mm or more.

The optical imaging system may selectively further include a fourth lens and a fifth lens. The fourth and fifth lenses, which are optionally included, may include the following features.

The fourth lens may have a predetermined degree of refractive power. For example, the fourth lens may have positive or negative refractive power. The fourth lens may have a shape of which one surface is convex. For example, the fourth lens may have a convex object-side surface or a convex image-side surface. The fourth lens has a predetermined refractive index. In an example, the fourth lens may have a refractive index equal to or greater than 1.6. The fourth lens may have a predetermined focal length. For example, the focal length of the fourth lens may be less than −10 mm, or may be equal to or greater than 40 mm.

The fifth lens may have a predetermined degree of refractive power. For example, the fifth lens may have positive or negative refractive power. The fifth lens may have a shape of which one surface is convex. For example, the fifth lens may have a convex object-side surface or a convex image-side surface. The fifth lens may have a predetermined refractive index. In an example, the fifth lens may have a refractive index of less than 1.6. The fifth lens may have a predetermined focal length. For example, the focal length of the fifth lens may be selected to be less than −200 mm, or to be greater than or equal to 30 mm.

The optical imaging system includes a lens formed of a plastic material. For example, in the example of the optical imaging system, at least one of five or more lenses constituting a lens group may be formed of a plastic material. The optical imaging system includes an aspherical lens. For example, in the optical imaging system, at least one of five or more lenses constituting the lens group may be an aspherical lens.

The optical imaging system may include a filter, an aperture, and an image sensor. The filter may be disposed between the image sensor and the lens disposed closest to the imaging plane. The filter blocks some wavelengths from the incident light to improve the resolution of the optical imaging system. For example, the filter may block the infrared wavelength of the incident light. The optical imaging system may have predetermined optical characteristics. For example, the f number of the optical imaging system may be equal to or greater than 2.8. As another example, the focal length of the optical imaging system may be equal to or greater than 19 mm. As another example, a distance BFL, from an image-side surface of a lens disposed closest to the imaging plane among the lenses of the optical imaging system, to the imaging plane of the image sensor, may be equal to or greater than 15 mm.

The optical imaging system may satisfy one or more of the following conditional expressions.

$$0.5 < BFL/TTL$$

$$3.2 < n2 + n3$$

$$0 \leq D12/f \leq 0.07$$

$$0.8 \leq EL1S2/EL1S1 \leq 1.01$$

$$0.8 \leq TTL/f \leq 1.25$$

$$3.5 \leq TTL/ImgHT$$

$$0.2 \leq R1/f \leq 0.6$$

In the above conditional expressions, BFL is a distance from an image-side surface of a lens disposed closest to an imaging plane of the image sensor, to the imaging plane, TTL is a distance from an object-side surface of a lens (a first lens) disposed closest to an object, to the imaging plane, n2 is the refractive index of a second lens, n3 is the refractive index of a third lens, D12 is a distance from the image-side surface of the first lens to an object-side surface of the second lens, f is the focal length of the optical imaging system, and EL1S1 is the effective radius of the object-side surface of the first lens, EL1S2 is the effective radius of the image-side surface of the first lens, ImgHT is the height of the imaging plane (½ of the diagonal length of the imaging plane), and R1 is the radius of curvature of the object-side surface of the first lens.

The optical imaging system may further satisfy one or more of the following conditional expressions.

$$0.5 < BFL/f$$

$$4.0 < BFL/ImgHT$$

$$0.8 < P1P2/f < 2.0$$

$$0.9 < P1Le/BFL < 2.0$$

$$2.1 < f/ImgHT$$

$$DT13/f < 0.27$$

$$4.2 < BFL/T1$$

$$0.2 < (PTTL - TTL)/BFL < 0.8$$

In the above conditional expressions, P1P2 is the distance from the intersection (the first intersection point) of the first optical axis and the second optical axis to the intersection (the second intersection point) of the second optical axis and the third optical axis, P1Le is a distance from the first intersection point from the image-side surface of the lens disposed closest to the imaging plane of the image sensor, DT13 is the distance from the object-side surface of the first lens to the object-side surface of the third lens, T1 is the thickness at the center of the optical axis of the first lens, and PTTL is the distance from the first intersection point to the imaging plane.

A camera module according to an example will be described with reference to FIG. 1.

A camera module 10 may include a plurality of optical path conversion units P1 and P2, an optical imaging system 100, a filter IF, and an image sensor IP. The camera module 10 may further include a driving unit. In an example, the camera module 10 may further include a driving unit that moves the optical imaging system 100 in the optical axis direction. The driving unit may be in the form of a magnet and a coil. However, the configuration of the driving unit is not limited to the magnet and the coil. In an example, the driving unit may be changed to have other forms such as, but not limited to, a shape memory alloy, a piezoelectric element, and the like, within a range in which the optical imaging system 100 may be moved.

The optical path conversion units P1 and P2 are configured to convert the optical path of light reflected from the subject. In an example, the first optical path conversion unit P1 may convert light incident on a first optical axis C1, in the direction of a second optical axis C2 intersecting the first optical axis C1, and the second optical path conversion unit P2 may convert light incident on the second optical axis C2, in the direction of a third optical axis C3 intersecting the second optical axis C2. The first optical path conversion unit P1 and the second optical path conversion unit P2 are configured to convert the optical paths in different directions.

In an example, the optical path (in a second optical axis direction C2) converted by the first optical path conversion unit P1 may be formed to intersect the optical path (in a third optical axis direction C3) converted by the second optical path conversion unit P2. Additionally, the optical path, for example, in optical axis direction C3, (in the third optical axis direction) converted by the second optical path conversion unit P2, may be formed to intersect the path, for example, in optical axis direction C1, (in a first optical axis direction) of light incident on the first optical path conversion unit P1. The optical path conversion units P1 and P2 may be respectively disposed on the front and rear of the optical imaging system 100.

In an example, the first optical path conversion unit P1 may be disposed in front of a frontmost lens 110 of the optical imaging system 100, and the second optical path conversion unit P2 may be disposed in rear of a rearmost lens 150 of the optical imaging system 100.

The optical imaging system 100 is configured to form an image of light reflected from the subject, on the imaging plane of the image sensor IP. For example, the optical imaging system 100 may form an image of light incident in the camera module 10 through the lens having refractive power, on the image sensor IP. The optical imaging system 100 may include a plurality of lenses. For example, the optical imaging system 100 may be comprised of three or more lenses. The optical imaging system 100 may have an extended length of back focal length (BFL). In an example, the BFL of the optical imaging system 100 may be equal to or greater than 15 mm.

As an example, in FIG. 1, BFL is a sum of a distance from the image-side surface of the rearmost lens 150 to the intersection of the second optical axis C2 and the third optical axis C3, and a distance from the intersection of the second optical axis C2 and the third optical axis C3 to the imaging plane of the image sensor IP. The optical imaging system 100 may be disposed behind the first optical path conversion unit P1. However, the arrangement position of the optical imaging system 100 is not limited to the rear (or an image side) of the first optical path conversion unit P1. In a non-limiting example, a portion of the lenses constituting the optical imaging system 100 may be disposed in front of the first optical path conversion unit P1 (or on the object side).

The filter IF may be configured to block light of components that inhibit the resolution of the camera module 10. For example, the filter IF may be configured to block light having an infrared wavelength from light incident on the image sensor IP. The filter IF may be disposed between the rearmost lens 150 of the optical imaging system 100 and the image sensor IP. In non-limiting examples, the filter IF may be disposed between the rearmost lens 150 and the second optical path conversion unit P2, or between the second optical path conversion unit P2 and the image sensor IP. Alternatively, the filter IF may be integrally formed on the incident surface or the exit surface of the second optical path conversion unit P2. As another example, the filter IF may be integrally formed on one surface of the image sensor IP. However, the filter IF may not necessarily be included in the camera module 10. For example, the filter IF may be omitted depending on the type of the camera module 10.

The image sensor IP is configured to convert an optical signal into an electrical signal. For example, the image sensor IP may have a form including a plurality of optical elements, and may be configured, for example, in a CMOS form.

The camera module 10 configured as described above may have an extended focal length. For example, the focal length of the camera module 10 may be equal to or greater than 19 mm. The camera module 10 according to an example may clearly image an object located at a relatively long distance from the camera module.

A camera module according to another example will be described with reference to FIG. 2.

A camera module 12 may include a plurality of optical path conversion units P1, P2 and P3, an optical imaging system 100, a filter IF, and an image sensor IP. The camera module 12 may further include a driving unit. In an example, the camera module 12 may further include a driving unit that moves the optical imaging system 100 in the optical axis direction. The driving unit may be configured to have a form that includes a magnet and a coil. However, the configuration of the driving unit is not limited to a magnet and a coil. For example, the driving unit may be changed to have other forms such as, but not limited to, a shape memory alloy, a piezoelectric element, and the like, within a range in which the optical imaging system 100 may be moved.

The optical path conversion units P1, P2 and P3 may be configured to convert the optical path of light reflected from the subject. In an example, the first optical path conversion unit P1 may convert light incident on the first optical axis C1 in the direction of the second optical axis C2 intersecting the first optical axis C1, and the second optical path conversion unit P2 may convert light incident on the second optical axis C2 in the direction of the third optical axis C3 intersecting the second optical axis C2, and the third optical path conversion unit P3 may convert light incident on the third optical axis C3 in the direction of the fourth optical axis C4 intersecting the third optical axis C3. The first optical path conversion unit P1 and the second optical path conversion unit P2 are configured to convert the optical paths in different directions.

In an example, the optical path (the second optical axis direction C2) converted by the first optical path conversion unit P1 may be formed to intersect the optical path, for example, in optical axis direction C3, (the third optical axis direction) converted by the second optical path conversion unit P2. Additionally, the optical path, for example, in optical axis direction C3, (the third optical axis direction) converted by the second optical path conversion unit P2 may be formed in a form intersecting the optical path, for example, in optical axis direction C1, (the first optical axis direction) incident on the first optical path conversion unit P1. The third optical path conversion unit P3 may be configured to form an optical path, for example, in optical axis direction C4, (in a fourth optical axis direction) parallel to the optical path, for example, in optical axis direction C2, (the second optical axis direction) converted by the first optical path conversion unit P1. In an example, the optical path, for example, in optical axis direction C4, (the fourth optical axis direction) converted by the third optical path conversion unit P3 may be substantially parallel to the optical path, for example, in optical axis direction C2, (the second optical axis direction) converted by the first optical path conversion unit P1. The optical path conversion units P1, P2 and P3 may be respectively disposed in front of the optical imaging system 100, and the rear of the optical imaging system 100. For example, the first optical path conversion unit P1 may be disposed in front of the frontmost lens 110 of the optical imaging system 100, and the second optical path conversion unit P2 and the third optical path conversion unit P3 may be disposed behind the rearmost lens 150 of the optical imaging system 100.

The optical imaging system 100 is configured to form an image of light reflected from the subject, on the imaging plane of the image sensor IP. In an example, the optical imaging system 100 may form an image of light incident in the camera module 12 through the lens having refractive power, on the image sensor IP. The optical imaging system 100 may include a plurality of lenses. For example, the optical imaging system 100 may be comprised of three or more lenses. The optical imaging system 100 may have an extended length of back focal length (BFL). For example, the BFL of the optical imaging system 100 may be equal to or greater than 15 mm.

For example, in FIG. 1, BFL is the sum of the distance from the image-side surface of the rearmost lens 150 to the intersection of the second optical axis C2 and the third optical axis C3 and the distance from the intersection of the second optical axis C2 and the third optical axis C3 to the imaging plane of the image sensor IP. The optical imaging system 100 may be disposed behind the first optical path conversion unit P1. However, the arranged position of the optical imaging system 100 is not limited to the rear (the image side) of the first optical path conversion unit P1. In an example, a portion of the lenses constituting the optical imaging system 100 may be disposed in front of the first optical path conversion unit P1, that is, the object side of the first optical path conversion unit P1.

The filter IF may be configured to block light of components that inhibit the resolution of the camera module 12. For example, the filter IF may be configured to block light having an infrared wavelength from light incident on the image sensor IP. The filter IF may be disposed between the rearmost lens 150 of the optical imaging system 100 and the image sensor IP. In non-limiting examples, the filter IF may be disposed between the rearmost lens 150 and the second optical path conversion unit P2, or between the second optical path conversion unit P2 and the image sensor IP. Alternatively, the filter IF may be integrally formed on the incident surface or the exit surface of the second optical path conversion unit P2.

Figure 2:
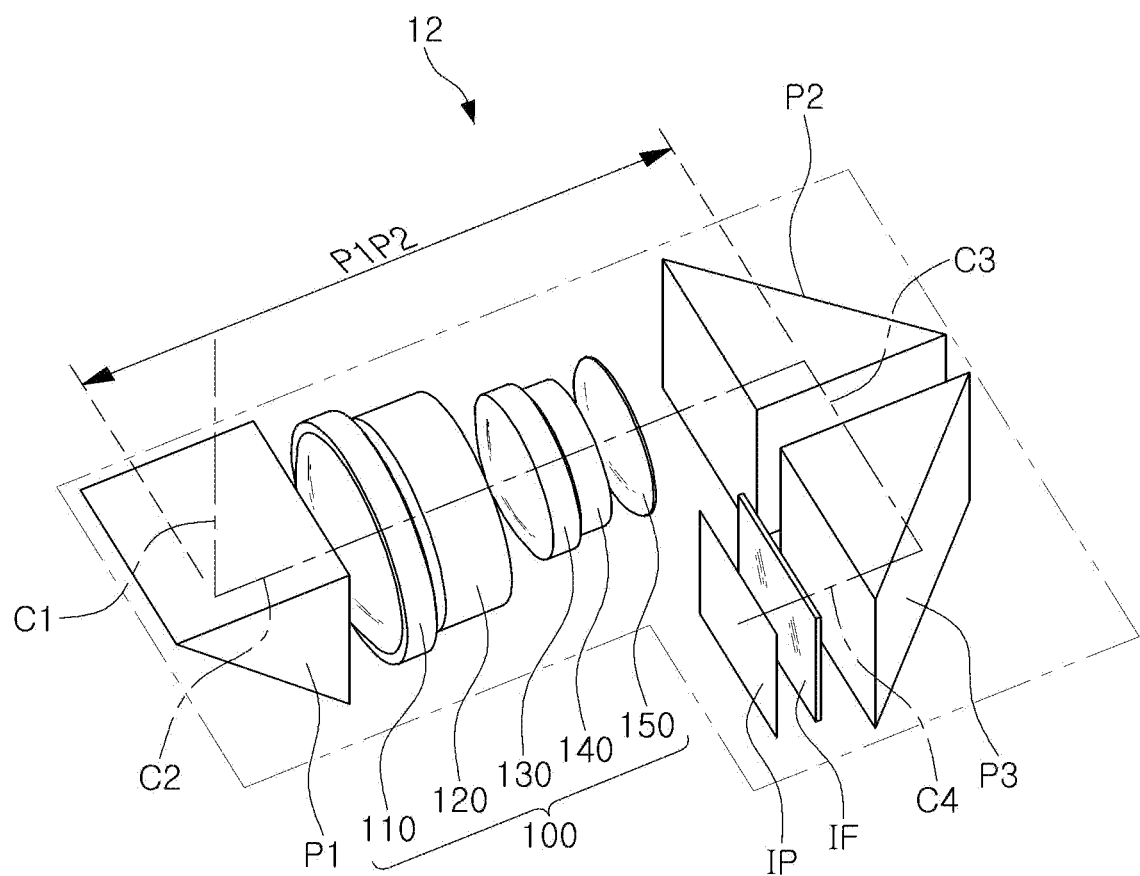
FIG. 2 illustrates an example camera module, in accordance with one or more embodiments.

Referring to FIG. 2, in another example, the filter IF may be disposed between the third optical path conversion unit P3 and the image sensor IP. As another example, the filter IF may be integrally formed on one surface of the image sensor IP. However, the filter IF is may not necessarily be included in the camera module 12. In an example, the filter IF may be omitted depending on the type of the camera module 12.

The image sensor IP is configured to convert an optical signal into an electrical signal. In an example, the image sensor IP may have a form including a plurality of optical elements, and may be configured in a CMOS form.

The camera module 12 configured as described above may have a long focal length. For example, the focal length of the camera module 12 may be greater than or equal to 19 mm. The camera module 12 according to this example may clearly image an object located at a relatively long distance from the camera module 12.

Next, various forms of the optical imaging system constituting the camera module will be described.

Figure 3:
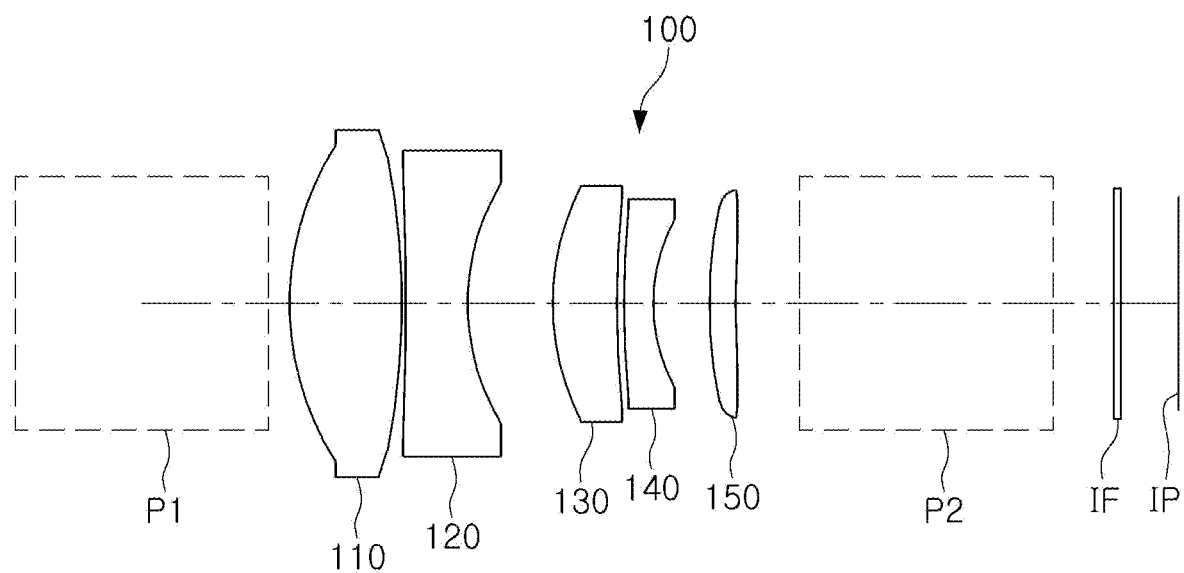
FIG. 3 illustrates an example optical imaging system, in accordance with one or more embodiments.

First, an optical imaging system according to a first example will be described with reference to FIG. 3.

An optical imaging system 100 includes a first lens 110, a second lens 120, a third lens 130, a fourth lens 140, and a fifth lens 150.

The first lens 110 has positive refractive power. The first lens 110 has a convex object-side surface and a convex image-side surface. The second lens 120 has negative refractive power. The second lens 120 has a convex object-side surface and a concave image-side surface. The third lens 130 has positive refractive power. The third lens 130 has a convex object-side surface and a concave image-side surface. The fourth lens 140 has negative refractive power. The fourth lens 140 has a convex object-side surface and a concave image-side surface. The fifth lens 150 has positive refractive power. The fifth lens 150 has a convex object-side surface and a concave image-side surface.

The optical imaging system 100 includes a filter IF and an image sensor IP. The filter IF is disposed in front of the image sensor IP, and blocks infrared rays and the like included in the incident light. The image sensor IP may be comprised of a plurality of optical sensors. The image sensor IP, configured as described above, is configured to convert an optical signal into an electrical signal. The image sensor IP may form an imaging plane on which an image of light incident through the first to fifth lenses 110 to 150 may be formed.

The optical imaging system 100 may be disposed between the optical path conversion units P1 and P2. For example, some lenses (the first lens 110 to the fifth lens 150) of the optical imaging system 100 may be disposed between the first optical path conversion unit P1 and the second optical path conversion unit P2.

Figure 4:
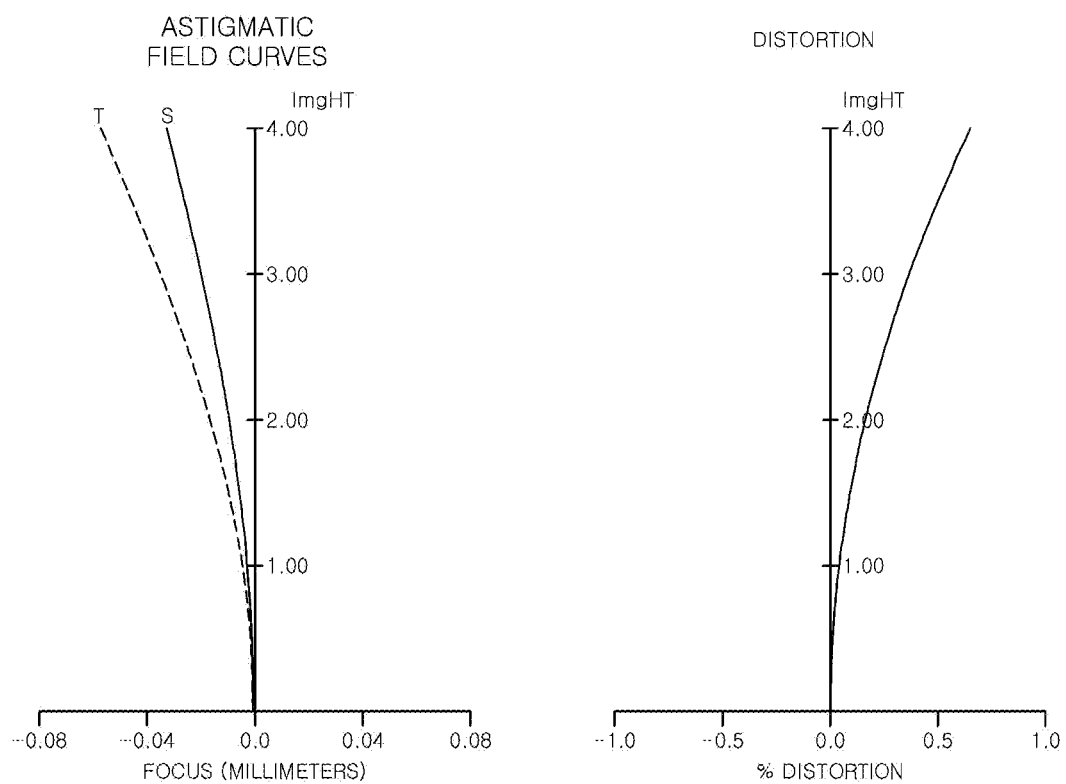
FIG. 4 illustrates an example aberration curve of the example optical imaging system illustrated in FIG. 3.

Table 1 illustrates lens characteristics of the optical imaging system 100 according to this example, and Table 2 illustrates aspherical values of the optical imaging system 100 according to this example. FIG. 4 is an aberration curve of the optical imaging system 100 configured as described above.

TABLE 1

| Surface No. | Remark | Curvature Radius | Thickness/ Distance | Refractive Index | Abbe Number | Effective Radius |
|---|---|---|---|---|---|---|
| S1 | First | Infinity | 0.000 | | | 6.000 |
| S2 | Prism | Infinity | 6.300 | 1.723 | 29.5 | 6.000 |
| S3 | | Infinity | 6.300 | 1.723 | 29.5 | 8.485 |
| S4 | | Infinity | 9.000 | | | 6.000 |
| S5 | First | 10.139 | 4.328 | 1.537 | 55.7 | 3.000 |
| S6 | Lens | −24.808 | 0.100 | | | 2.863 |
| S7 | Second | Infinity | 2.346 | 1.621 | 26.0 | 2.742 |
| S8 | Lens | 7.781 | 3.264 | | | 2.389 |
| S9 | Third | 9.127 | 2.445 | 1.679 | 19.2 | 2.321 |
| S10 | Lens | 29.427 | 0.198 | | | 2.276 |
| S11 | Fourth | 22.923 | 1.159 | 1.621 | 26.0 | 2.253 |
| S12 | Lens | 6.130 | 2.132 | | | 2.116 |
| S13 | Fifth | 14.307 | 1.029 | 1.547 | 56.1 | 2.754 |
| S14 | Lens | 58.747 | 3.318 | | | 2.674 |
| S15 | Second | Infinity | 0.000 | | | |
| S16 | Prism | Infinity | 6.300 | 1.723 | 29.5 | |
| S17 | | Infinity | 6.300 | 1.723 | 29.5 | |
| S18 | | Infinity | 1.000 | | | |
| S19 | Filter | Infinity | 0.210 | 1.519 | 64.2 | 3.491 |
| S20 | | Infinity | 2.144 | | | 3.515 |
| S21 | Imaging plane | Infinity | 0.001 | | | 4.203 |

TABLE 2

| Surface No. | K | A | B | C | D |
|---|---|---|---|---|---|
| S5 | −6.8560E−01 | 3.2923E−05 | −1.4960E−07 | −3.6045E−09 | −7.2078E−11 |
| S6 | −2.2664E+00 | 9.3697E−05 | −5.6890E−07 | −1.1178E−08 | −2.9730E−10 |
| S7 | 0.0000E+00 | −1.8235E−04 | 3.7153E−06 | −1.8196E−08 | −2.6087E−10 |
| S8 | 7.1908E−02 | −4.0643E−04 | 8.7645E−07 | −7.6931E−08 | 3.7457E−09 |
| S9 | 6.6624E−02 | −3.4314E−04 | 6.0040E−06 | −5.6471E−08 | −1.3302E−09 |
| S10 | −3.9170E+00 | −3.7672E−04 | 9.6172E−06 | −1.7071E−07 | −5.2749E−10 |
| S11 | 3.4965E+00 | −3.2773E−04 | −1.7493E−06 | 2.7021E−07 | −1.4153E−08 |
| S12 | −9.7030E−02 | −7.4890E−04 | 1.0657E−05 | 7.9532E−07 | 2.8211E−08 |
| S13 | −7.0889E−01 | −6.6756E−04 | 5.2247E−06 | 4.9932E−07 | 2.1551E−08 |
| S14 | −1.0569E+01 | −4.7328E−04 | −3.0750E−06 | 1.3530E−07 | 1.1652E−08 |

| Surface No. | E | F | G | H | J |
|---|---|---|---|---|---|
| S5 | −4.5249E−12 | 2.5488E−14 | −1.1182E−15 | −6.9351E−17 | −1.5714E−18 |
| S6 | −7.7777E−12 | −3.1870E−13 | −5.8554E−15 | −8.4695E−17 | 6.1814E−18 |
| S7 | −1.6655E−11 | −2.9717E−13 | −2.3168E−15 | 2.4692E−17 | 6.1489E−18 |
| S8 | −5.1179E−11 | −2.9616E−12 | −3.6675E−14 | −1.4140E−15 | −6.2653E−17 |
| S9 | 9.4807E−11 | 2.5486E−14 | −7.1800E−14 | −1.6552E−14 | 1.6964E−16 |
| S10 | −1.1509E−10 | −1.9832E−11 | −8.8397E−13 | 2.5981E−15 | 8.7574E−16 |
| S11 | −1.9853E−10 | −2.6360E−11 | −1.0944E−12 | 9.9003E−15 | 1.8211E−15 |
| S12 | −4.2341E−09 | −4.8315E−12 | 2.5693E−12 | 1.3739E−13 | −3.3511E−15 |
| S13 | 5.2141E−10 | −9.6339E−11 | −4.5370E−13 | −2.0918E−12 | 2.0070E−13 |
| S14 | −5.5284E−10 | −5.7823E−10 | 5.9639E−11 | 5.9679E−13 | −1.1348E−13 |

An optical imaging system 200 according to a second example will be described with reference to FIG. 5.

Figure 5:
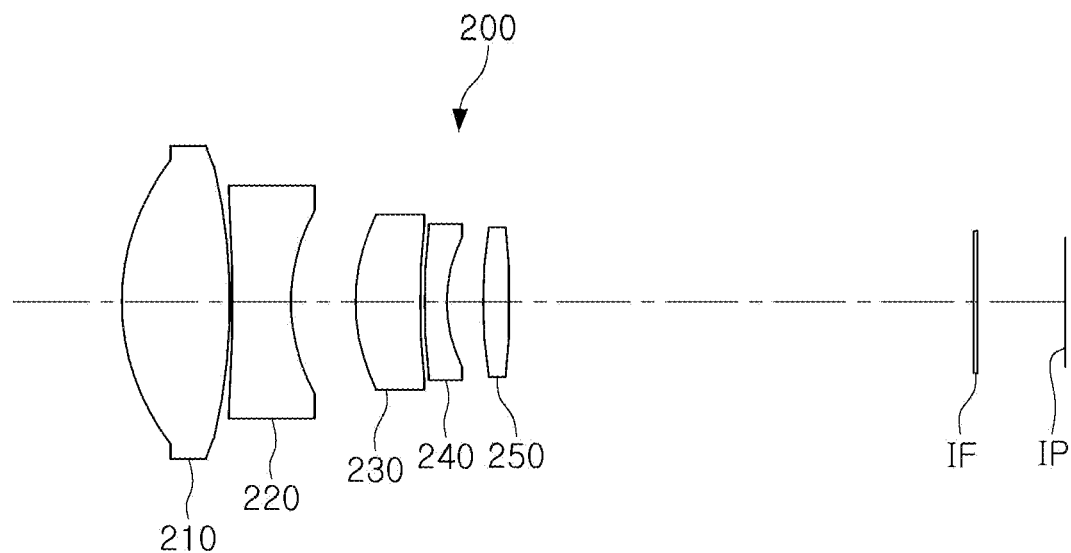
FIG. 5 illustrates an example optical imaging system, in accordance with one or more embodiments.

An optical imaging system 200, as illustrated in FIG. 5, includes a first lens 210, a second lens 220, a third lens 230, a fourth lens 240, and a fifth lens 250.

The first lens 210 has positive refractive power. The first lens 210 has a convex object-side surface and a convex image-side surface. The second lens 220 has negative refractive power. The second lens 220 has a shape in which an object-side surface is concave and an image-side surface is concave. The third lens 230 has positive refractive power. The third lens 230 has a convex object-side surface and a concave image-side surface. The fourth lens 240 has negative refractive power. The fourth lens 240 has a convex object-side surface and a concave image-side surface. The fifth lens 250 has positive refractive power. The fifth lens 250 has a convex object-side surface and a convex image-side surface.

The optical imaging system 200 includes a filter IF and an image sensor IP. The filter IF is disposed in front of the image sensor IP and blocks infrared rays and the like included in the incident light. The image sensor IP may be comprised of a plurality of optical sensors. The image sensor IP, configured as described above, is configured to convert an optical signal into an electrical signal. The image sensor IP may form an imaging plane on which an image of light incident through the first to fifth lenses 210 to 250 may be formed.

The optical imaging system 200 may be disposed between the optical path conversion units P1 and P2. For example, some lenses (the first lens 210 to fifth lens 250) of the optical imaging system 200 may be disposed between the first optical path conversion unit P1 and the second optical path conversion unit P2.

Figure 6:
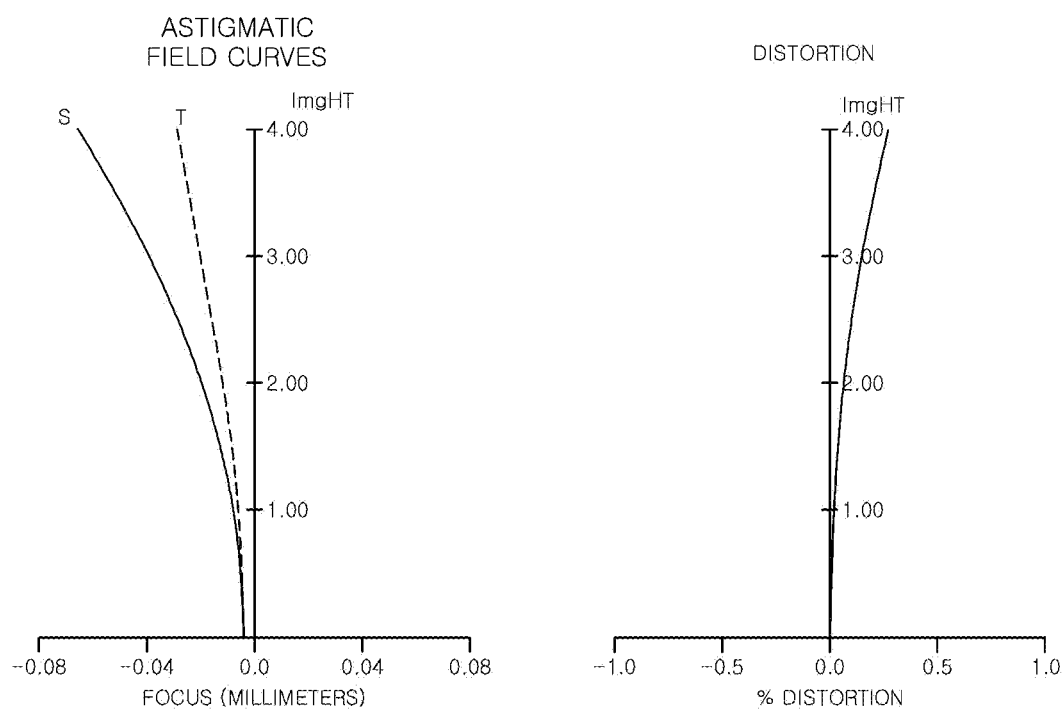
FIG. 6 illustrates an example aberration curve of the example optical imaging system illustrated in FIG. 5.

Table 3 illustrates lens characteristics of the optical imaging system 200 according to this example, and Table 4 illustrates aspherical values of the optical imaging system 200 according to this example. FIG. 6 is an aberration curve of the optical imaging system 200 configured as described above.

TABLE 3

| Surface No. | Remark | Curvature Radius | Thickness/ Distance | Refractive Index | Abbe Number | Effective Radius |
|---|---|---|---|---|---|---|
| S1 | First | Infinity | 0.000 | | | 6.000 |
| S2 | Prism | Infinity | 6.000 | 1.723 | 29.5 | 6.000 |
| S3 | | Infinity | 6.000 | 1.723 | 29.5 | 8.485 |
| S4 | | Infinity | 2.350 | | | 6.000 |
| S5 | First | 15.241 | 5.931 | 1.537 | 55.7 | 2.500 |
| S6 | Lens | −38.195 | 0.107 | | | 2.219 |
| S7 | Second | −275.860 | 3.171 | 1.621 | 26.0 | 2.178 |
| S8 | Lens | 12.034 | 3.575 | | | 2.028 |
| S9 | Third | 13.354 | 3.565 | 1.679 | 19.2 | 2.002 |
| S10 | Lens | 47.598 | 0.196 | | | 2.040 |
| S11 | Fourth | 39.104 | 1.215 | 1.621 | 26.0 | 2.045 |
| S12 | Lens | 9.411 | 2.004 | | | 1.989 |
| S13 | Fifth | 27.689 | 1.387 | 1.547 | 56.1 | 2.754 |
| S14 | Lens | −93.536 | 12.377 | | | 2.639 |
| S15 | Second | Infinity | 0.000 | | | |
| S16 | Prism | Infinity | 6.000 | 1.723 | 29.5 | |
| S17 | | Infinity | 6.000 | 1.723 | 29.5 | |
| S18 | | Infinity | 1.000 | | | |
| S19 | Filter | Infinity | 0.210 | 1.519 | 64.2 | 3.588 |
| S20 | | Infinity | 4.807 | | | 3.614 |
| S21 | Imaging plane | Infinity | 0.002 | | | 4.200 |

TABLE 4

| Surface No. | K | A | B | C | D |
|---|---|---|---|---|---|
| S5 | −6.8799E−01 | 9.6270E−06 | −1.7468E−08 | −1.6520E−10 | −1.6880E−12 |
| S6 | −2.2876E+00 | 2.7802E−05 | −7.5743E−08 | −6.5689E−10 | −7.3886E−12 |
| S7 | 0.0000E+00 | −5.4103E−05 | 4.9106E−07 | −1.0290E−09 | −6.8884E−12 |
| S8 | 7.4584E−02 | −1.1985E−04 | 1.1151E−07 | −4.6600E−09 | 9.5882E−11 |
| S9 | 5.7621E−02 | −1.0236E−04 | 7.8608E−07 | −3.2835E−09 | −3.6256E−11 |
| S10 | −3.4563E+00 | −1.1099E−04 | 1.2701E−06 | −1.0214E−08 | −1.7372E−12 |
| S11 | 3.2996E+00 | −9.7802E−05 | −2.4226E−07 | 1.5121E−08 | −4.4001E−10 |
| S12 | −9.1303E−02 | −2.2065E−04 | 1.4331E−06 | 4.7237E−08 | 7.8577E−10 |
| S13 | −7.9544E−01 | −1.9865E−04 | 7.7968E−07 | 3.0609E−08 | 3.6042E−10 |
| S14 | 1.0370E+00 | −1.3835E−04 | −6.9113E−07 | 2.3485E−09 | 5.4307E−11 |

| Surface No. | E | F | G | H | J |
|---|---|---|---|---|---|
| S5 | −5.2923E−14 | 1.0439E−16 | −2.8467E−18 | −7.0831E−20 | −6.9794E−22 |
| S6 | −8.0900E−14 | −1.4484E−15 | −1.1160E−17 | −7.4169E−20 | 2.4791E−21 |
| S7 | −2.0355E−13 | −1.7165E−15 | −7.3942E−18 | 7.8341E−20 | 5.5891E−21 |
| S8 | −5.5095E−13 | −1.2476E−14 | 9.7509E−18 | 2.0635E−19 | −2.8543E−20 |
| S9 | 1.0988E−12 | 1.0762E−15 | −1.4803E−16 | −1.4338E−17 | 2.5985E−19 |
| S10 | −1.2184E−12 | −9.8283E−14 | −2.1098E−15 | −1.0978E−17 | −7.7560E−19 |
| S11 | −8.2800E−13 | −1.5038E−13 | −2.6748E−15 | 3.9932E−18 | 9.5909E−19 |
| S12 | −4.4980E−11 | 4.8752E−14 | 8.6133E−15 | 2.4805E−16 | 2.3507E−18 |
| S13 | 1.3433E−12 | −1.9917E−13 | −1.2735E−14 | −2.8410E−16 | −1.2624E−17 |
| S14 | −6.8154E−12 | −8.8829E−13 | 1.5709E−15 | 9.4151E−17 | 1.2443E−17 |

Figure 7:
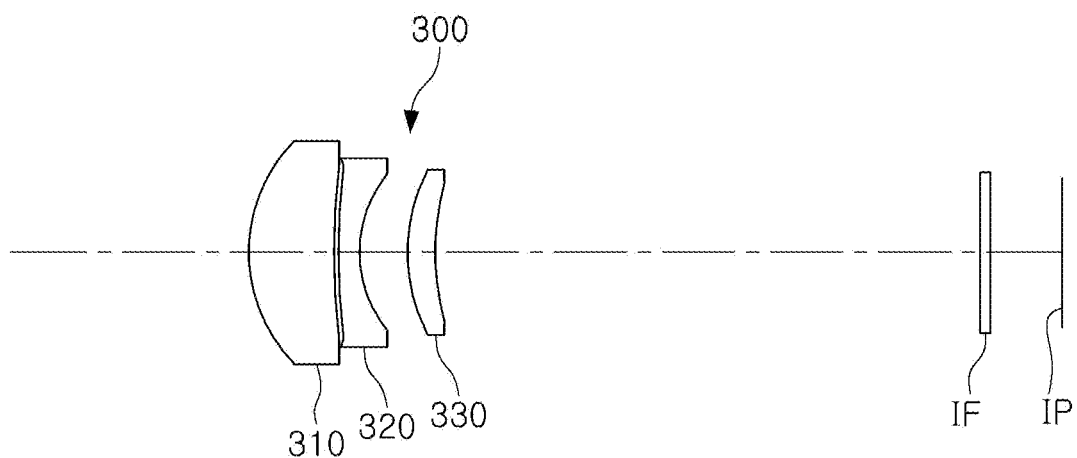
FIG. 7 illustrates an example optical imaging system, in accordance with one or more embodiments.

An optical imaging system 300 according to a third example will be described with reference to FIG. 7.

An optical imaging system 300 includes a first lens 310, a second lens 320, and a third lens 330.

The first lens 310 has positive refractive power. The first lens 310 has a convex object-side surface and a concave image-side surface. The second lens 320 has negative refractive power. The second lens 320 has a convex object-side surface and a concave image-side surface. The third lens 330 has positive refractive power. The third lens 330 has a convex object-side surface and a concave image-side surface.

The optical imaging system 300 includes a filter IF and an image sensor IP. The filter IF is disposed in front of the image sensor IP and blocks infrared rays included in the incident light. The image sensor IP is comprised of a plurality of optical sensors. The image sensor IP, configured as described above, is configured to convert an optical signal into an electrical signal. The image sensor IP may provide an imaging plane on which an image of light incident through the first to third lenses 310 to 330 may be formed.

The optical imaging system 300 may be disposed between the optical path conversion units P1 and P2. For example, some lenses (the first lens 310 to third lens 330) of the optical imaging system 300 may be disposed between the first optical path conversion unit P1 and the second optical path conversion unit P2.

Figure 8:
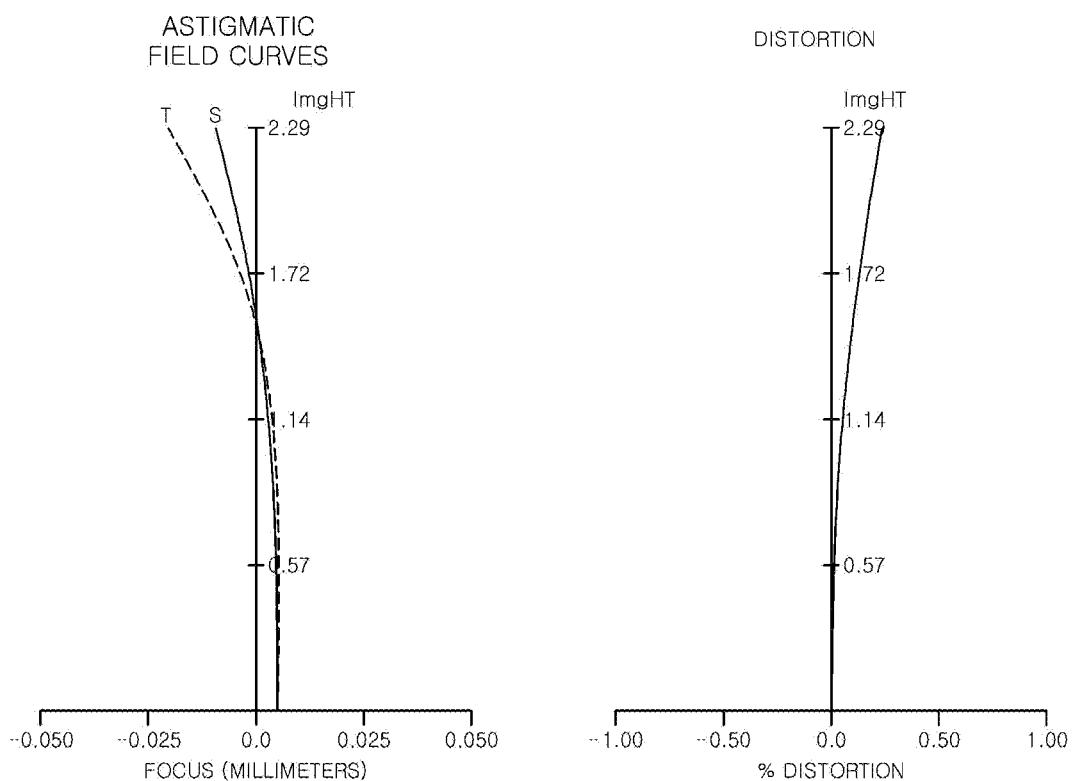
FIG. 8 illustrates an example aberration curve of the example optical imaging system illustrated in FIG. 7.

Table 5 illustrates the lens characteristics of the optical imaging system 300 according to this example, and Table 6 illustrates aspherical values of the optical imaging system 300 according to this example. FIG. 8 is an aberration curve of the optical imaging system 300 configured as described above.

TABLE 5

| Surface No. | Remark | Curvature Radius | Thickness/ Distance | Refractive Index | Abbe Number | Effective Radius |
|---|---|---|---|---|---|---|
| S1 | First | Infinity | 0.000 | | | 5.396 |
| S2 | Prism | Infinity | 5.500 | 1.723 | 29.5 | 5.000 |
| S3 | | Infinity | 5.500 | 1.723 | 29.5 | 7.000 |
| S4 | | Infinity | 3.000 | | | 5.000 |
| S5 | First | 5.055 | 2.550 | 1.585 | 59.5 | 3.120 |
| S6 | Lens | 44.279 | 0.096 | | | 2.683 |
| S7 | Second | 19.256 | 0.620 | 1.621 | 26.0 | 2.642 |
| S8 | Lens | 3.635 | 1.408 | | | 2.322 |
| S9 | Third | 5.762 | 0.799 | 1.679 | 19.2 | 2.304 |
| S10 | Lens | 9.182 | 2.088 | | | 2.180 |
| S11 | Second | Infinity | 0.000 | | | 2.263 |
| S12 | Prism | Infinity | 5.500 | 1.723 | 29.5 | 2.264 |
| S13 | | Infinity | 5.500 | 1.723 | 29.5 | 2.299 |
| S14 | | Infinity | 3.000 | | | |
| S15 | Filter | Infinity | 0.210 | 1.519 | 64.2 | 2.263 |
| S16 | | Infinity | 2.099 | | | 2.264 |
| S17 | Imaging plane | Infinity | −0.005 | | | 2.299 |

TABLE 6

| Surface No. | K | A | B | C | D |
|---|---|---|---|---|---|
| S5 | 9.2974E−02 | −1.9922E−04 | 1.6594E−04 | −1.0951E−04 | 3.5054E−05 |
| S6 | −9.9000E+01 | −5.6901E−03 | 1.5430E−02 | −1.4784E−02 | 7.9711E−03 |
| S7 | 3.8621E+01 | −1.4387E−02 | 1.8558E−02 | −1.6739E−02 | 9.2665E−03 |
| S8 | 2.1047E−01 | −1.2439E−02 | 5.0135E−03 | −3.7128E−03 | 2.6715E−03 |
| S9 | −6.7684E−01 | −7.8204E−04 | −2.7484E−05 | 2.9992E−05 | 8.9822E−05 |
| S10 | 8.9150E+00 | −1.0430E−03 | 9.0012E−05 | −2.9192E−04 | 2.4618E−04 |

| Surface No. | E | F | G | H | J |
|---|---|---|---|---|---|
| S5 | −6.6059E−06 | 6.7421E−07 | −2.8101E−08 | −3.7526E−10 | 4.6251E−11 |
| S6 | −2.6009E−03 | 5.1989E−04 | −6.1986E−05 | 4.0376E−06 | −1.1040E−07 |
| S7 | −3.1334E−03 | 6.4905E−04 | −8.0251E−05 | 5.4291E−06 | −1.5444E−07 |
| S8 | −1.1985E−03 | 3.3051E−04 | −5.5481E−05 | 5.1871E−06 | −2.0584E−07 |
| S9 | −5.7847E−05 | 2.7425E−05 | −7.8515E−06 | 1.0976E−06 | −5.8071E−08 |
| S10 | −1.1247E−04 | 4.5396E−05 | −1.2890E−05 | 1.9130E−06 | −1.1014E−07 |

Figure 9:
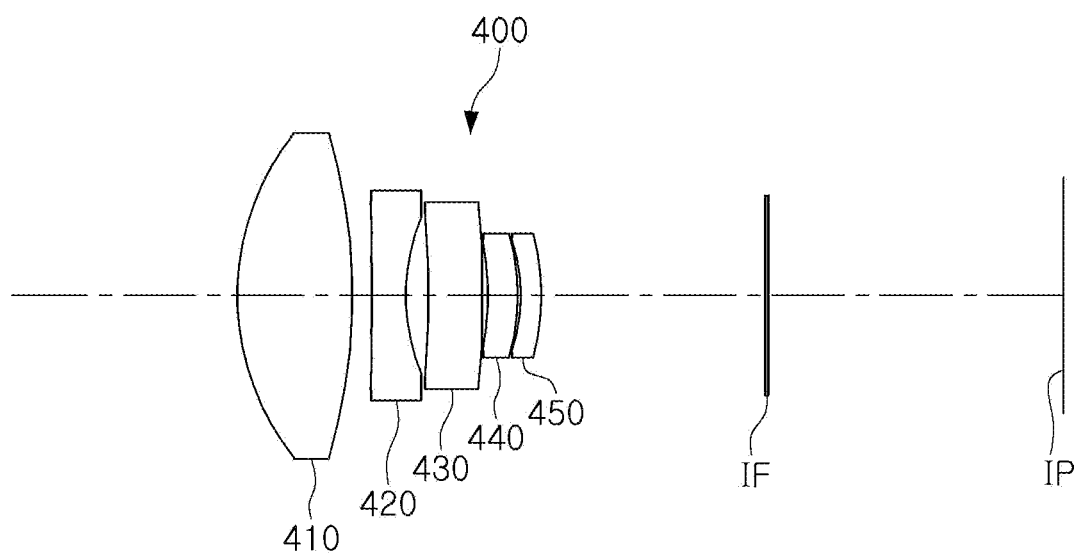
FIG. 9 illustrates an example optical imaging system, in accordance with one or more embodiments.

An optical imaging system 400 according to a fourth example will be described with reference to FIG. 9.

An optical imaging system 400 includes a first lens 410, a second lens 420, a third lens 430, a fourth lens 440, and a fifth lens 450.

The first lens 410 has positive refractive power. The first lens 410 has a convex object-side surface and a convex image-side surface. The second lens 420 has negative refractive power. The second lens 420 has a convex object-side surface and a concave image-side surface. The third lens 430 has negative refractive power. The third lens 430 has a convex object-side surface and a concave image-side surface. The fourth lens 440 has positive refractive power. The fourth lens 440 has a concave object-side surface and a convex image-side surface. The fifth lens 450 has negative refractive power. The fifth lens 450 has a concave object-side surface and a convex image-side surface.

The optical imaging system 400 includes a filter IF and an image sensor IP. The filter IF is disposed in front of the image sensor IP, and blocks infrared rays included in the incident light. The image sensor IP is comprised of a plurality of optical sensors. The image sensor IP, configured as described above, is configured to convert an optical signal into an electrical signal. The image sensor IP may form an imaging plane on which an image of light incident through the first to fifth lenses 410 to 450 may be formed.

The optical imaging system 400 may be disposed between the optical path conversion units. For example, some lenses (the first lens 410 to fifth lens 450) of the optical imaging system 400 may be disposed between the first optical path conversion unit P1 and the second optical path conversion unit P2.

Figure 10:
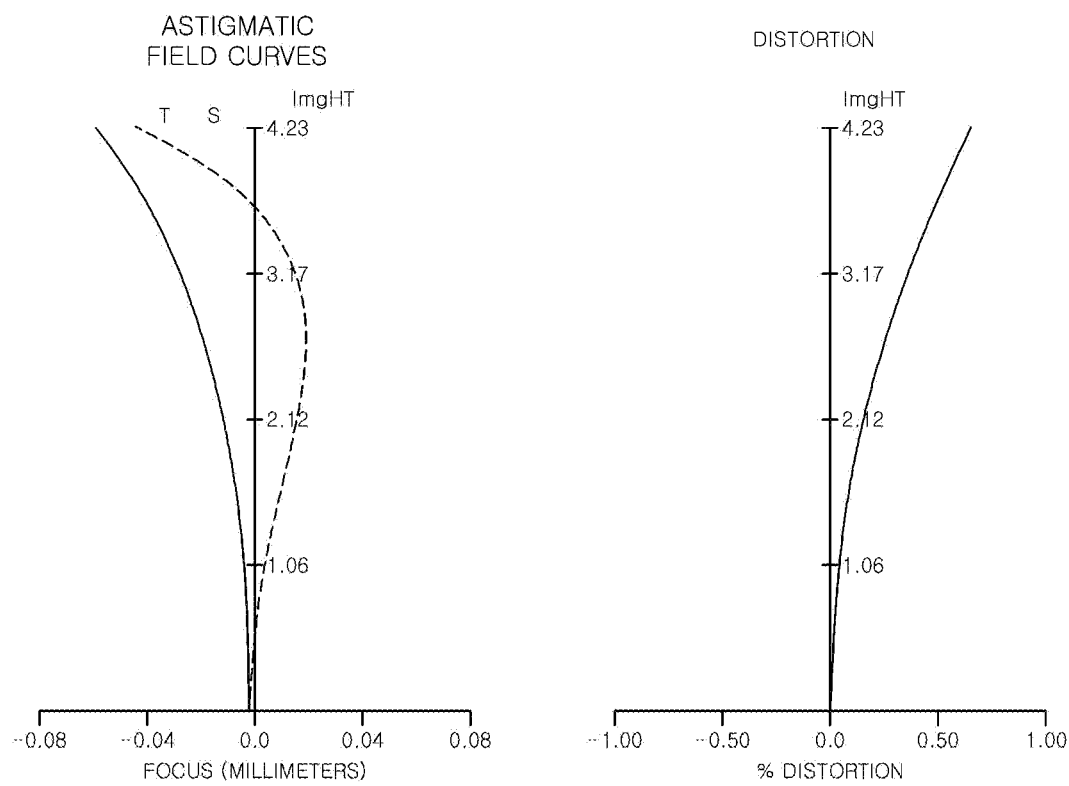
FIG. 10 illustrates an aberration curve of the example optical imaging system illustrated in FIG. 9.

Table 7 illustrates the lens characteristics of the optical imaging system 400 according to this example, and Table 8 illustrates aspherical values of the optical imaging system 400 according to this example. FIG. 10 is an aberration curve of the optical imaging system 400 configured as described above.

TABLE 7

| Surface No. | Remark | Curvature Radius | Thickness/ Distance | Refractive Index | Abbe Number | Effective Radius |
|---|---|---|---|---|---|---|
| S1 | First | Infinity | 0.000 | | | 6.000 |
| S2 | Prism | Infinity | 5.500 | 1.723 | 29.5 | 6.000 |
| S3 | | Infinity | 5.500 | 1.723 | 29.5 | 8.485 |
| S4 | | Infinity | 3.000 | | | 6.000 |
| S5 | First | 8.641 | 4.136 | 1.537 | 55.7 | 5.250 |

TABLE 7-continued

| Surface No. | Remark | Curvature Radius | Thickness/ Distance | Refractive Index | Abbe Number | Effective Radius |
|---|---|---|---|---|---|---|
| S6 | Lens | −17.420 | 0.691 | | | 5.250 |
| S7 | Second | 39.627 | 1.199 | 1.621 | 26.0 | 3.376 |
| S8 | Lens | 6.050 | 0.830 | | | 2.800 |
| S9 | Third | 131.845 | 1.917 | 1.679 | 19.2 | 3.000 |
| S10 | Lens | 114.648 | 0.231 | | | 3.000 |

TABLE 7-continued

| Surface No. | Remark | Curvature Radius | Thickness/ Distance | Refractive Index | Abbe Number | Effective Radius |
|---|---|---|---|---|---|---|
| S11 | Fourth | −10.402 | 1.074 | 1.642 | 23.9 | 2.000 |
| S12 | Lens | −8.271 | 0.118 | | | 2.000 |
| S13 | Fifth | −6.041 | 0.737 | 1.571 | 37.4 | 2.000 |
| S14 | Lens | −6.560 | 4.000 | | | 2.000 |
| S15 | Second | Infinity | 0.000 | | | |
| S16 | Prism | Infinity | 5.500 | 1.723 | 29.5 | |
| S17 | | Infinity | 5.500 | 1.723 | 29.5 | |
| S18 | | Infinity | 3.000 | | | |
| S19 | Filter | Infinity | 0.110 | 1.519 | 64.2 | 3.205 |
| S20 | | Infinity | 0.548 | | | 3.212 |
| S21 | Imaging plane | Infinity | 0.002 | | | 4.231 |

TABLE 8

| Surface No. | K | A | B | C | D |
|---|---|---|---|---|---|
| S5 | −1.0852E+00 | 1.6347E−04 | −2.3721E−06 | −1.3370E−08 | 8.6057E−09 |
| S6 | 0.0000E+00 | 8.6255E−04 | −1.9430E−04 | 2.1751E−05 | −1.4635E−06 |
| S7 | 0.0000E+00 | 9.7597E−05 | −3.5319E−04 | 4.7682E−05 | −3.7835E−06 |
| S8 | 0.0000E+00 | −1.0345E−03 | −4.3759E−04 | 9.4710E−05 | −9.7916E−06 |
| S9 | 0.0000E+00 | −1.7600E−03 | −5.8595E−04 | 1.5900E−04 | −1.6749E−05 |
| S10 | 0.0000E+00 | −9.8128E−04 | −1.9735E−04 | −4.1341E−05 | 1.8610E−05 |
| S11 | 0.0000E+00 | −7.7084E−04 | 1.3482E−03 | −3.9995E−04 | 6.0523E−05 |
| S12 | 0.0000E+00 | −5.2463E−03 | 1.7690E−03 | −2.2442E−04 | 1.1197E−05 |
| S13 | 0.0000E+00 | −3.1293E−04 | 2.8250E−04 | 9.1893E−05 | −2.7801E−05 |
| S14 | 0.0000E+00 | 3.9178E−03 | −6.2770E−04 | 1.5181E−04 | −2.3407E−05 |

| Surface No. | E | F | G | H | J |
|---|---|---|---|---|---|
| S5 | −9.7167E−10 | 5.5562E−11 | −1.6389E−12 | 2.3600E−14 | −1.3090E−16 |
| S6 | 6.4959E−08 | −1.8998E−09 | 3.4843E−11 | −3.6013E−13 | 1.5914E−15 |
| S7 | 1.9564E−07 | −6.4008E−09 | 1.2675E−10 | −1.3905E−12 | 6.5273E−15 |
| S8 | 5.5086E−07 | −1.7800E−08 | 3.2524E−10 | −3.0455E−12 | 1.0652E−14 |
| S9 | 9.7136E−07 | −3.5543E−08 | 8.8492E−10 | −1.4440E−11 | 1.1416E−13 |
| S10 | −2.3831E−06 | 1.5388E−07 | −5.4672E−09 | 1.0192E−10 | −7.7936E−13 |
| S11 | −5.1642E−06 | 2.5857E−07 | −7.5330E−09 | 1.1817E−10 | −7.7091E−13 |
| S12 | 2.8352E−07 | −6.4622E−08 | 3.3204E−09 | −7.6838E−11 | 6.9013E−13 |
| S13 | 3.0163E−06 | −1.6959E−07 | 5.2626E−09 | −8.5623E−11 | 5.7126E−13 |
| S14 | 2.1958E−06 | −1.2536E−07 | 4.2268E−09 | −7.7025E−11 | 5.8349E−13 |

Figure 11:
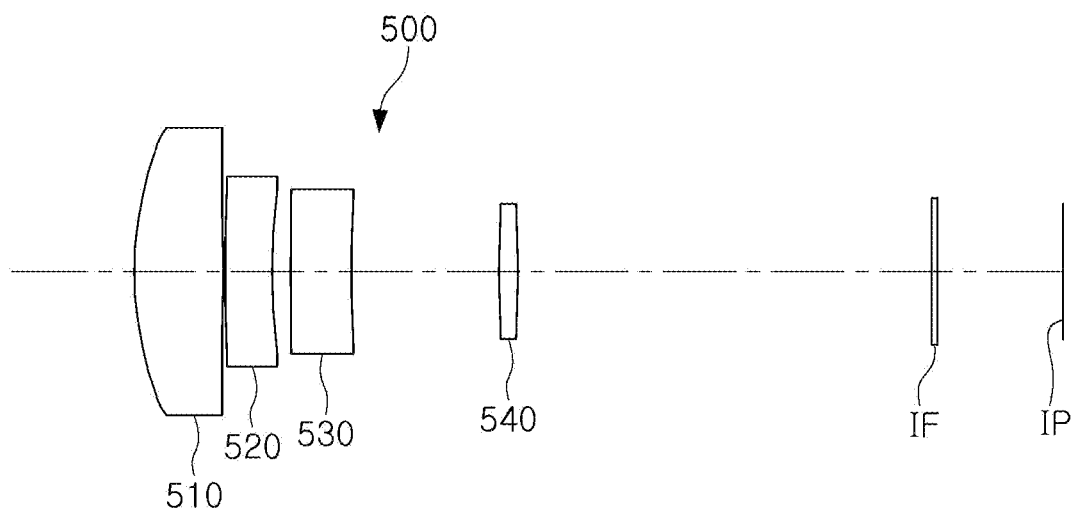
FIG. 11 illustrates an example optical imaging system, in accordance with one or more embodiments.

An optical imaging system 500 according to a fifth example will be described with reference to FIG. 11.

An optical imaging system 500 includes a first lens 510, a second lens 520, a third lens 530, and a fourth lens 540.

The first lens 510 has positive refractive power. The first lens 510 has a convex object-side surface and a convex image-side surface. The second lens 520 has negative refractive power. The second lens 520 has a convex object-side surface and a concave image-side surface. The third lens 530 has negative refractive power. The third lens 530 has a convex object-side surface and a concave image-side surface. The fourth lens 540 has positive refractive power. The fourth lens 540 has a convex object-side surface and a convex image-side surface.

The optical imaging system 500 includes a filter IF and an image sensor IP. The filter IF is disposed in front of the image sensor IP, and blocks infrared rays included in the incident light. The image sensor IP is comprised of a plurality of optical sensors. The image sensor IP, configured as described above, is configured to convert an optical signal into an electrical signal. The image sensor IP may form an imaging plane on which an image of light incident through the first to fourth lenses 510 to 540 may be formed.

The optical imaging system 500 may be disposed between the optical path conversion units P1 and P2. For example, some lenses (the first lens 510 to fourth lens 540) of the optical imaging system 500 may be disposed between the first optical path conversion unit P1 and the second optical path conversion unit P2.

Figure 12:
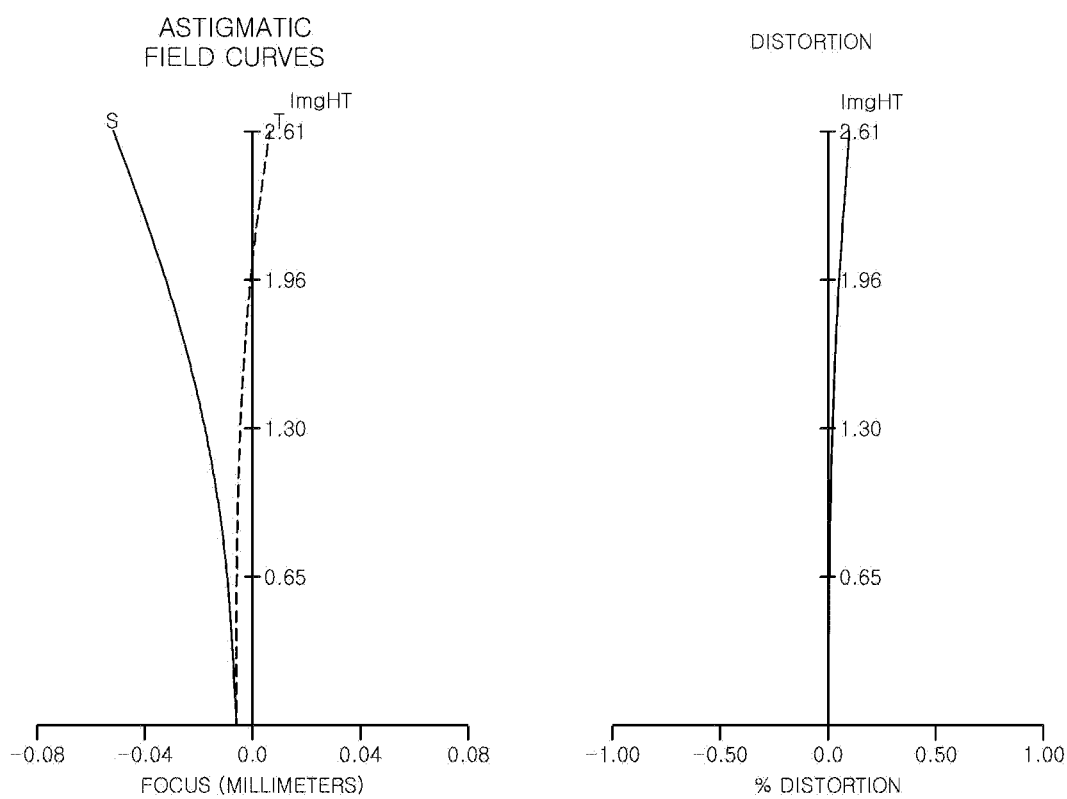
FIG. 12 illustrates an example aberration curve of the example optical imaging system illustrated in FIG. 11.

Table 9 illustrates the lens characteristics of the optical imaging system 500 according to this example, and Table 10 illustrates aspherical values of the optical imaging system 500 according to this example. FIG. 12 is an aberration curve of the optical imaging system 500 configured as described above.

TABLE 9

| Surface No. | Remark | Curvature Radius | Thickness/ Distance | Refractive Index | Abbe Number | Effective Radius |
|---|---|---|---|---|---|---|
| S1 | First | Infinity | 0.000 | | | 5.000 |
| S2 | Prism | Infinity | 5.500 | 1.723 | 29.5 | 5.000 |
| S3 | | Infinity | 5.500 | 1.723 | 29.5 | 7.000 |
| S4 | | Infinity | 3.000 | | | 5.000 |
| S5 | First | 12.776 | 3.513 | 1.537 | 55.7 | 5.000 |
| S6 | Lens | −680.650 | 0.100 | | | 3.356 |
| S7 | Second | 61.994 | 1.819 | 1.621 | 26.0 | 3.308 |
| S8 | Lens | 19.881 | 0.740 | | | 2.976 |
| S9 | Third | 127.584 | 2.363 | 1.679 | 19.2 | 2.871 |
| S10 | Lens | 48.259 | 5.746 | | | 2.726 |
| S11 | Fourth | 51.342 | 0.718 | 1.621 | 26.0 | 2.334 |
| S12 | Lens | −68.743 | 2.116 | | | 2.348 |
| S13 | Second | Infinity | 0.000 | | | |
| S14 | Prism | Infinity | 5.500 | 1.723 | 29.5 | |
| S15 | | Infinity | 5.500 | 1.723 | 29.5 | |
| S16 | | Infinity | 3.000 | | | |
| S17 | Filter | Infinity | 0.210 | 1.519 | 64.2 | 2.548 |
| S18 | | Infinity | 4.882 | | | 2.550 |
| S19 | Imaging plane | Infinity | 0.006 | | | 2.610 |

TABLE 10

| Surface No. | K | A | B | C | D |
|---|---|---|---|---|---|
| S5 | −5.5411E−01 | 1.4391E−05 | −1.4583E−09 | 4.4686E−10 | 2.3897E−11 |
| S6 | 0.0000E+00 | 2.4373E−05 | −4.9908E−08 | 2.5235E−10 | −1.0261E−11 |
| S7 | 0.0000E+00 | −5.0351E−05 | 4.6441E−07 | −2.0817E−09 | −3.9684E−11 |
| S8 | −6.6252E−02 | −1.2426E−04 | 1.5694E−07 | −2.6617E−09 | 4.7462E−10 |
| S9 | 0.0000E+00 | −9.7554E−05 | 8.2723E−07 | 2.4513E−09 | −5.0641E−11 |
| S10 | −4.8833E+00 | −1.1222E−04 | 1.3556E−06 | −1.7363E−08 | −3.2615E−10 |
| S11 | −6.8685E+00 | −2.1020E−04 | −4.0907E−07 | −1.9156E−08 | −2.2606E−09 |
| S12 | −6.3308E+01 | −1.2463E−04 | 4.9349E−07 | 1.6866E−08 | −7.2062E−09 |

| Surface No. | E | F | G | H | J |
|---|---|---|---|---|---|
| S5 | −7.8102E−13 | −1.1673E−13 | −5.9715E−15 | 4.1240E−16 | 1.3638E−16 |
| S6 | 8.3994E−13 | 1.5634E−13 | 1.4634E−14 | 5.2184E−16 | 4.0752E−17 |
| S7 | −4.9812E−12 | −6.5938E−13 | −6.5454E−14 | −5.5323E−15 | −5.5888E−16 |
| S8 | 3.4669E−11 | 1.5162E−12 | −2.4294E−14 | −8.8442E−15 | −9.2681E−16 |
| S9 | −7.1688E−11 | 3.7193E−12 | 2.9820E−13 | 2.8519E−14 | 2.9405E−15 |
| S10 | −6.3193E−11 | −5.3250E−12 | −4.8063E−13 | −4.5025E−14 | −4.6750E−15 |
| S11 | −3.2309E−10 | −7.1206E−11 | −1.8418E−11 | −4.6287E−12 | −1.1039E−12 |
| S12 | −5.0373E−10 | −1.2609E−10 | −2.4332E−11 | −4.2031E−12 | −6.5489E−13 |

Table 11 illustrates optical characteristics of the optical imaging systems according to the first to fifth examples.

TABLE 11

| Remark | First Example | Second Example | Third Example | Fourth Example | Fifth Example |
|---|---|---|---|---|---|
| f | 38.000 | 51.065 | 19.050 | 28.865 | 32.000 |
| f1 | 14.019 | 21.121 | 9.518 | 11.395 | 23.412 |
| f2 | −12.537 | −18.502 | −7.331 | −11.664 | −47.952 |
| f3 | 18.583 | 26.238 | 20.798 | −1354.670 | −115.724 |
| f4 | −13.850 | −20.288 | — | 52.564 | 53.894 |
| f5 | 34.328 | 39.252 | — | −276.067 | — |
| PTTL | 51.573 | 59.896 | 32.365 | 38.093 | 44.714 |
| TTL | 36.273 | 51.546 | 23.865 | 29.593 | 36.214 |
| BFL | 19.273 | 30.396 | 18.392 | 18.659 | 21.214 |
| f number | 3.230 | 4.250 | 4.180 | 4.740 | 4.620 |
| ImgHT | 4.000 | 4.000 | 2.290 | 4.230 | 2.610 |
| FOV | 36.920 | 24.610 | 10.050 | 16.460 | 8.930 |
| P1P2 | 41.918 | 47.877 | 21.561 | 28.934 | 31.116 |

Table 12 illustrates values of conditional expressions of the optical imaging systems according to the first to fifth examples. As can be seen from Table 12, the optical imaging systems according to the first to fifth examples satisfy all of the above conditional expressions.

TABLE 12

| Conditional Expression | First Example | Second Example | Third Example | Fourth Example | Fifth Example |
|---|---|---|---|---|---|
| BFL/TTL | 0.5313 | 0.5897 | 0.7707 | 0.6305 | 0.5858 |
| n2 + n3 | 3.2995 | 3.2995 | 3.2995 | 3.2995 | 3.2995 |
| D12/f | 0.0026 | 0.0021 | 0.0050 | 0.0239 | 0.0031 |
| EL1S2/EL1S1 | 0.9542 | 0.8877 | 0.8599 | 1.0000 | 0.6711 |
| TTL/f | 0.9545 | 1.0094 | 1.2527 | 1.0252 | 1.1317 |
| TTL/ImgHT | 9.0682 | 12.8866 | 10.4213 | 6.9960 | 13.8751 |
| R1/f | 0.2668 | 0.2985 | 0.2653 | 0.2994 | 0.3993 |
| P1Le/BFL | 1.6760 | 0.9705 | 1.6344 | 1.0415 | 1.8675 |
| P1P2/f | 1.1031 | 0.9376 | 1.1318 | 1.0024 | 0.9724 |
| f/ImgHT | 4.8182 | 7.5990 | 8.0315 | 4.4112 | 8.1279 |
| DT13/f | 0.2642 | 0.2504 | 0.2454 | 0.2375 | 0.1929 |
| BFL/T1 | 4.4527 | 5.1254 | 7.2126 | 4.5111 | 6.0392 |
| (PTTL − TTL)/BFL | 0.7939 | 0.2747 | 0.4622 | 0.4555 | 0.4007 |

Figure 13:
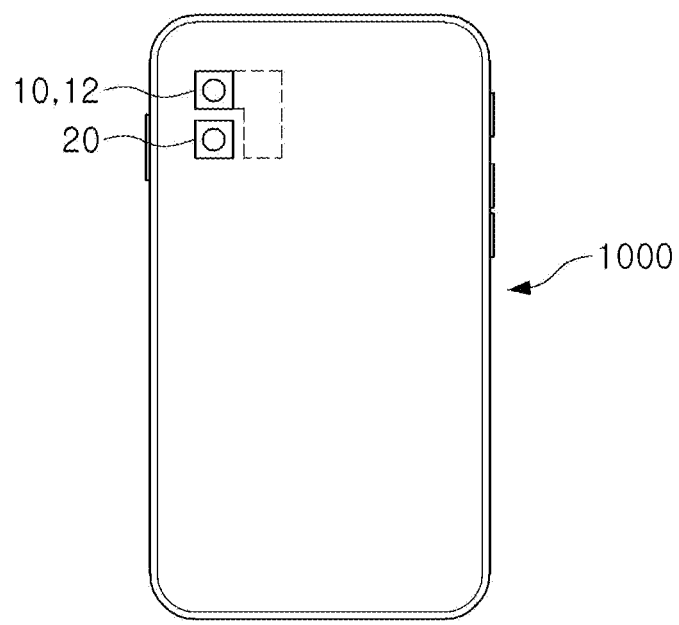
FIGS. 13 to 15 illustrate example rear views of portable terminals having a camera module, in accordance with one or more embodiments.
Figure 14:
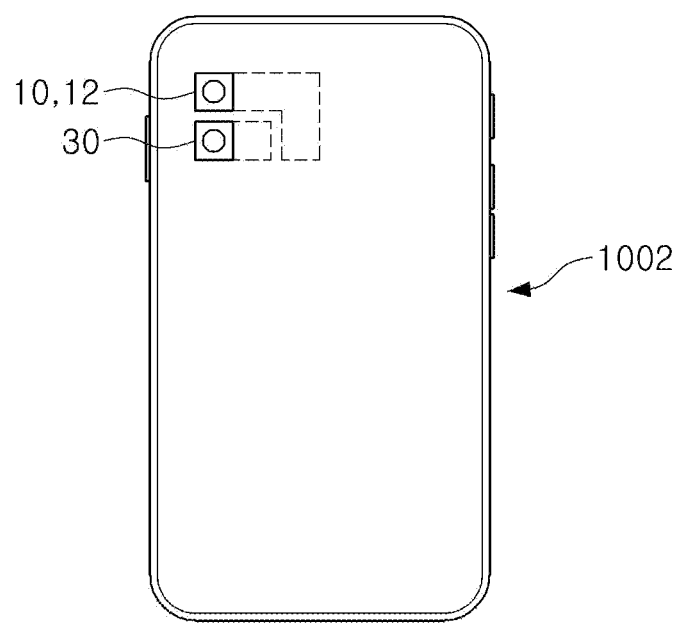
Figure 15:
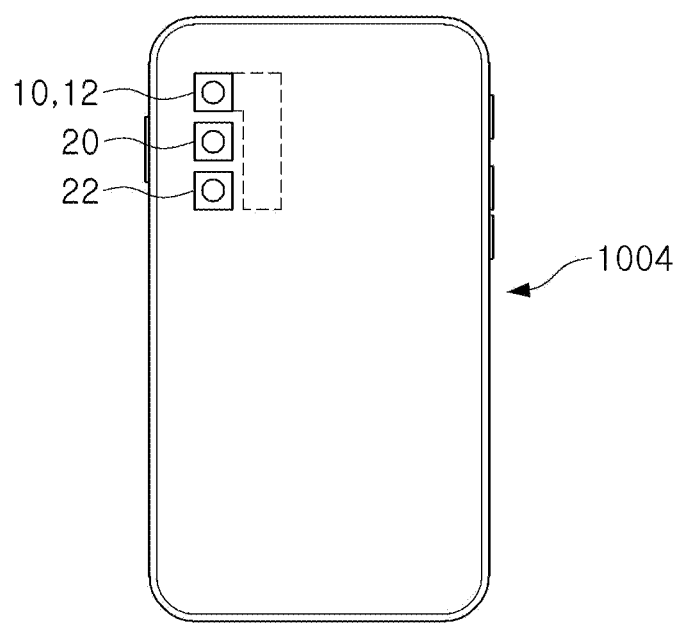

A portable terminal having a camera module according to an example will be described with reference to FIGS. 13 to 15.

First, a portable terminal according to an example will be described with reference to FIG. 13.

A portable terminal 1000 according to an example may include one or more of the above-described camera modules 10 and 12. The camera modules 10 and 12 may include one of the optical imaging systems 100, 200, 300, 400 and 500 as described above. In an example, the portable terminal 1000 may include a different type of camera module 20, in addition to the camera modules 10 and 12 according to the example. The portable terminal 1000 may image a long-distance object through the camera modules 10 and 12 and a short-distance object through the camera module 20.

A portable terminal according to another example will be described with reference to FIG. 14.

A portable terminal 1002 according to an example may include one or more of the camera modules 10 and 12 described above. The camera modules 10 and 12 may include one of the optical imaging systems 100, 200, 300, 400 and 500 described above. The portable terminal 1002 may include a camera module 30 in a form similar to the camera modules 10 and 12 according to the example. For example, the camera module 30 may include one or more optical path conversion units. As another example, the camera module 30 may be configured to image a distant subject.

A portable terminal according to another example will be described with reference to FIG. 15.

A portable terminal 1004 according to another example may include two camera modules 20 and 22 in a form that is different from the camera modules 10 and 12 according to the example. The camera modules 10 and 12 include one of the optical imaging systems 100, 200, 300, 400 and 500 described above, and may image a long-distance object. The camera modules 20 and 22 may be configured to exhibit optical characteristics that are different from optical characteristics of the camera modules 10 and 12 according to the example. In an example, the camera module 20 may be configured to image a short-distance subject, and the camera module 22 may be configured to image a subject located between a long-distance and a short-distance. The camera modules 10, 12, 20 and 22 may be configured to be disposed side by side in a longitudinal direction of the portable terminal 1004. However, the arranged form of the camera modules 10, 12, 20 and 22 is not limited to the form illustrated in FIG. 15. For example, the camera modules 10, 12, 20 and 22 may be disposed side by side in a width direction of the portable terminal 1004.

As set forth above, according to an example, the optical imaging system and the camera module that may be mounted on a small terminal while having a long focal length may be implemented.

While this disclosure includes specific examples, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
a first optical path conversion unit, configured to reflect or refract light incident along a first optical axis in a direction of a second optical axis that intersects the first optical axis;
a second optical path conversion unit, configured to reflect or refract light incident along the second optical axis in a direction of a third optical axis that respectively intersects the first optical axis and the second optical axis; and
an optical imaging system disposed between the first optical path conversion unit and the second optical path conversion unit,
wherein the optical imaging system comprises a total of five or fewer lenses having refractive power including a first lens, a second lens, and a third lens sequentially disposed from an object side to an imaging side,
wherein a refractive index of the third lens is equal to or greater than 1.65, and
wherein the second lens has a concave image-side surface in a paraxial region.

2. The camera module of claim 1, wherein the optical imaging system satisfies a conditional expression, 0.5<BFL/f,
where BFL is a distance from an image-side surface of a lens closest to an imaging plane in the optical imaging system to the imaging plane, and f is a focal length of the optical imaging system.

3. The camera module of claim 1, wherein the first lens has positive refractive power,
the second lens has negative refractive power, and
the third lens has positive refractive power.

4. The camera module of claim 1, wherein the optical imaging system comprises a fourth lens and a fifth lens having refractive power.

5. The camera module of claim 1, wherein the first lens has positive refractive power,
the second lens has negative refractive power,
the third lens has negative refractive power, and
the fourth lens has positive refractive power.

6. The camera module of claim 1, wherein a focal length (f) of the optical imaging system is equal to or greater than 19 mm.

7. The camera module of claim 1, wherein a distance from a first intersection point of the first optical axis and the second optical axis to a second intersection point of the second optical axis and the third optical axis is greater than a focal length (f) of the optical imaging system.

8. A camera module comprising:
a first optical path conversion unit and a second optical path conversion unit, each configured to change an optical path; and
an optical imaging system disposed between the first optical path conversion unit and the second optical path conversion unit, the optical imaging system comprising a total of five or fewer lenses having refractive power including a first lens, a second lens having a concave image-side surface in a paraxial region, and a third lens sequentially disposed from an object side to an imaging side,
wherein a refractive index of the third lens is equal to or greater than 1.65, and wherein the optical imaging system satisfies a conditional expression, 4.0<BFL/ImgHT,
where BFL is a distance from an image-side surface of a lens disposed closest to an imaging plane to the imaging plane, and ImgHT is a height of the imaging plane.

9. The camera module of claim 8, wherein the first lens has positive refractive power.

10. The camera module of claim 8, wherein the third lens has a shape of which an object-side surface is convex and of which an image-side surface is concave.

11. The camera module of claim 8, wherein the optical imaging system comprises a fourth lens having refractive power.

12. The camera module of claim 11, wherein the optical imaging system comprises a fifth lens having refractive power.

13. The camera module of claim 8, wherein the BFL is equal to or greater than 15 mm.

14. The camera module of claim 1, wherein a back focal length (BFL) of the optical imaging system is equal to or greater than 15 mm.

15. The camera module of claim 1, wherein a focal length of the first lens is in a range of 8.0 mm to 25.0 mm.

16. The camera module of claim 1, wherein the second lens has a focal length in a range of −50.0 mm to −6.0 mm.

17. The camera module of claim 1, wherein the first lens has a convex object-side surface.

* * * * *